L. J. LINDSAY.
TAKE-UP AND TENSION ATTACHMENT FOR AUTOMOBILE STEERING DEVICES.
APPLICATION FILED JULY 29, 1920.

1,380,724.

Patented June 7, 1921.

Inventor
Leroy J. Lindsay
By Orwig & Hager Attorneys

UNITED STATES PATENT OFFICE.

LEROY J. LINDSAY, OF SEYMOUR, IOWA, ASSIGNOR TO CHARLES WESLEY BRYANT, OF CENTERVILLE, IOWA.

TAKE-UP AND TENSION ATTACHMENT FOR AUTOMOBILE STEERING DEVICES.

1,380,724.  Specification of Letters Patent.  Patented June 7, 1921.

Application filed July 29, 1920. Serial No. 399,685.

*To all whom it may concern:*

Be it known that I, LEROY J. LINDSAY, a citizen of the United States, and resident of Seymour, in the county of Wayne and State of Iowa, have invented a certain new and useful Take-Up and Tension Attachment for Automobile Steering Devices, of which the following is a specification.

The object of my invention is to provide a device of simple, durable and inexpensive construction, designed to be readily, quickly and easily applied to the steering levers of an automobile or the like, which application may be made without the use of tools, and whereby the wear or lost motion to the vertical shanks of the spindles and the joints at the ends of the connecting rod, may be taken up and thereby avoid rattling, and to hold the front wheels truly in their proper positions so that the automobile may be accurately and easily steered.

My invention consists in the construction, arrangement and combination of the various parts of the device, whereby the ob25 jects contemplated are attained, as hereinafter more fully set forth, pointed out in my claims, and illustrated in the accompanying drawings, in which:

Figure 1:
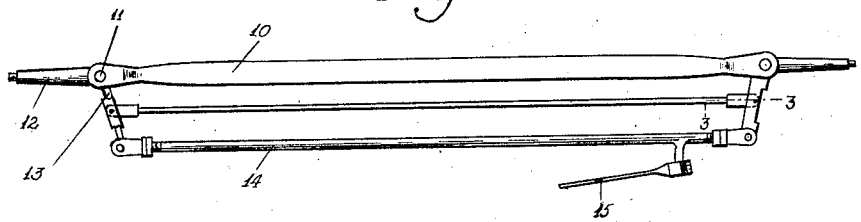
Figure 1 shows a top or plan view of an automobile axle with the spindles mounted in the ends thereof and the steering levers extended rearwardly therefrom, and the connecting rod attached thereto in the ordinary manner, with my improved take35 up and tension device applied to the steering levers.
Figure 2:
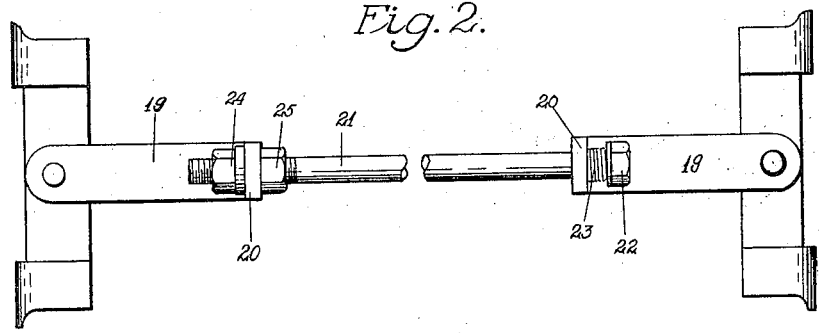
Fig. 2 shows an enlarged, detail, inverted view of a take-up and tension attachment embodying my invention.
Figure 3:
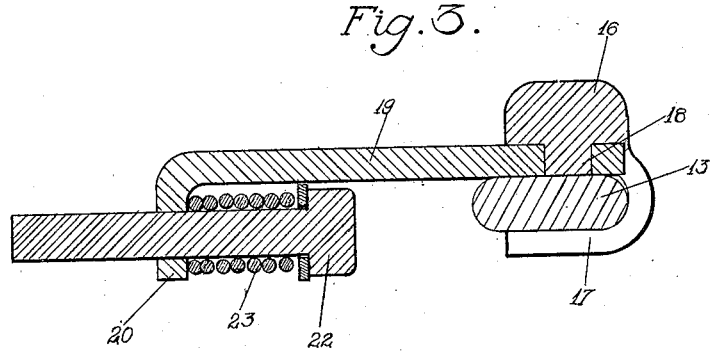
Figure 4:
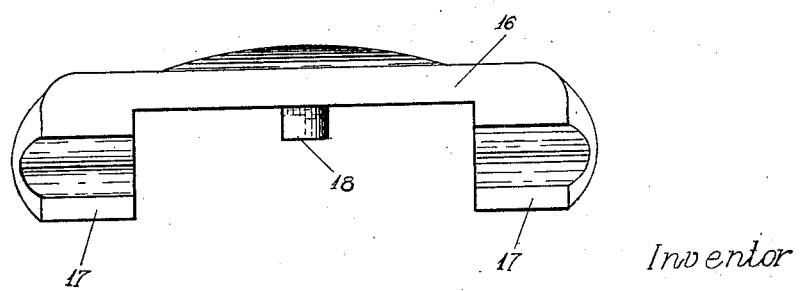

Fig. 3 shows an enlarged, detail, sectional view, taken on the line 3—3 of Fig. 1; and Fig. 4 shows an enlarged detail view of one of the clips to be secured to the steering levers.

Referring to the accompanying drawings, I have used the reference numeral 10 to indicate the front axle of an automobile, having mounted in its ends the vertical shafts 11 to which the spindles 12 are fixed.

Extending rearwardly from the shaft 11 are the steering arms 13, which are also preferably inclined inwardly toward a central longitudinal line through the automobile to which the device is attached. At the rear ends of the steering levers is a connecting rod 14, pivotally connected at its ends to the steering levers, and attached to this connecting rod is an arm 15 connected to the steering wheel and by which the connecting rod may be moved.

The construction heretofore described is that now in common use in automobiles. These parts, and particularly the pivotal joints thereof, are subjected to considerable wear, and after a comparatively slight period of use there is considerable lost motion or wear in these pivotal joints, and this results in causing these parts to rattle, and it also permits the front wheels to move somewhat independently of each other, thus making accurate steering of the automobile quite difficult.

My device is intended to be used in the nature of an attachment, and comprises two clips, each having a body portion 16 designed to rest on top of the steering levers 13. At the ends of the body portion are the substantially U-shaped loops 17, which extend under the steering levers 13, as shown in Fig. 3, and preferably fit tightly around the steering levers, these U-shaped loops being open at the side toward the longitudinal center of the automobile.

Mounted in the body portion 16 is a downwardly extending pivot pin 18, preferably of hardened metal, which extends down far enough so that it will touch, or nearly touch, the top of the steering lever 13 when the clip is in place, as shown in Fig. 3.

The front end of the body portion 16 is shaped to fit against the vertical shaft 11, and the rear end is shaped to fit against the end portion of the connecting rod 14, so that in this manner all end-wise motion of the clips is prevented.

With each clip there is a bracket 19 having an opening therein to receive the pivot pin 18, and also having a downwardly extending portion 20 provided with an opening through which the rod 21 is extended. The thickness of the body portion of the bracket is such that it may enter between the body portion of the clip 16 and the top of the steering arm 13, as shown in Fig. 3.

The rod 21 is provided with a head 22 at one end, and there is an extensible coil spring 23 between the head and the downwardly extending part 20 of the bracket 19. On the other end there is a nut 24 and a lock nut 25, so that the length of the rod may be thereby adjusted and securely held in its adjusted position.

It is important that the parts be so shaped and arranged that the pivotal centers of the upright shaft 11 on one side, the pivotal connection of the connecting rod 14 with the steering lever 13, and the pivot connecting, be in line with each other, because when these three points are in line then the steering wheels may be turned throughout their normal path of travel without any binding effect upon the pivot pins 18.

In practical use the device is applied to an automobile by first placing the brackets 19 on the pivot pins 18, and then passing the U-shaped loops of the clips around the outer sides and bottoms of the steering levers. Then the rod 21 is passed through the opening in the downwardly extending portion 20 of the bracket 19, and the nut 24 is tightened until the parts are all firmly held in position and until the coil spring 23 is drawn up tight enough so that the coils touch each other, thus making the device substantially rigid. When this has been done it is obvious that the upright shafts 11 will be firmly held toward the inner sides of the bearings in which they rest, and the pivot pins of the connecting rod 14 will also be held at their inward limit of movement within the bearings at the ends of the connecting rods, so that there can be no rattling or lost motion in these parts.

The spring 23 serves to take up any wear that may occur between the pivot pin 18 and the bearing in which it rests in the bracket 19.

I have found that after the steering mechanism of an automobile has been subjected to such wear as to make it difficult to do accurate steering, my attachment may be applied thereto and all of the lost motion taken up to such an extent that the steering wheels may be controlled just as accurately and just as easily as with a new automobile.

Furthermore, the very objectionable rattling of these parts is at once eliminated.

I claim as my invention:

1. The combination with an automobile steering mechanism, of clips designed to be detachably secured to the steering levers, a connecting device pivoted to said clips between their ends, and means for adjusting the said connecting device for holding the said clips toward each other.

2. An attachment for automobile steering devices, comprising two clips designed to be passed around the outer sides of automobile steering levers, a rod pivotally connected at its ends to said clips, and means for adjusting said rod for moving the clips toward each other.

3. An attachment for automobile steering devices, comprising two clips, each designed to be fitted around the outer side, the top and bottom of a steering lever, a pivot pin projecting downwardly from the clip toward the steering lever, brackets pivotally connected to said pivot pins, and an adjustable connecting device for said brackets.

4. An attachment for automobile steering devices, comprising two clips, each designed to be fitted around the outer side, the top and bottom of a steering lever, a pivot pin projecting downwardly from the clip toward the steering lever, brackets pivotally connected to said pivot pins, a rod connected to said brackets, means for adjusting the rod, and an extensible coil spring applied to the rod for holding the brackets in a direction toward each other, for the purposes stated.

Des Moines, Iowa, July 20, 1920.

LEROY J. LINDSAY.